United States Patent [19]

Swars

[11] Patent Number: 5,433,926
[45] Date of Patent: Jul. 18, 1995

[54] ELECTRICALLY HEATABLE HONEYCOMB BODY DIVIDED INTO SUBREGIONS WITH ADDITIONAL ELECTRICAL CONDUCTOR ELEMENTS

[75] Inventor: Helmut Swars, Bergisch Gladbach, Germany

[73] Assignee: Emitec Gesellschaft fuer Emissionstechnologie mbH, Lohmar, Germany

[21] Appl. No.: 208,015

[22] Filed: Mar. 9, 1994

[30] Foreign Application Priority Data

Mar. 9, 1993 [DE] Germany .............. 43 07 431.6

[51] Int. Cl.⁶ .............. F01N 3/10; B01D 53/34
[52] U.S. Cl. .............. 422/174; 422/180; 422/199; 422/222; 219/553; 60/300
[58] Field of Search .............. 422/174, 177, 179, 180, 422/199, 211, 221, 222; 60/299, 300, 303, 320; 502/439, 527; 219/552, 553; 392/490, 491, 494

[56] References Cited

U.S. PATENT DOCUMENTS

| | | | |
|---|---|---|---|
| 4,801,915 | 1/1989 | Hahnewald | 219/355 X |
| 5,146,743 | 9/1992 | Maus et al. | 60/300 X |
| 5,202,547 | 4/1993 | Abe et al. | 422/174 X |
| 5,322,672 | 6/1994 | Breuer et al. | 422/180 |

FOREIGN PATENT DOCUMENTS

| | | |
|---|---|---|
| 0452125 | 10/1991 | European Pat. Off. . |
| 34303 | 12/1964 | Germany . |
| 3631852 | 1/1988 | Germany . |
| 8910471 | 11/1989 | WIPO . |

*Primary Examiner*—Robert J. Warden
*Assistant Examiner*—Theresa T. Snider
*Attorney, Agent, or Firm*—Herbert L. Lerner; Laurence A. Greenberg

[57] ABSTRACT

An electrically heatable honeycomb body through which a fluid can flow, in particular a carrier body for a catalytic converter, includes a plurality of subregions through which a current can flow over a winding path. The subregions have a first specific electrical conductivity per unit of cross-sectional area. Electrical insulation at least partially separates the subregions from one another. Additional electric conductor elements are disposed in regions in which the electric current is turned around. The additional electric conductor elements are formed of a material having a greater mechanical strength than that of the subregions and have a second specific electrical conductivity per unit of cross-sectional area being higher than the first specific electrical conductivity per unit of cross-sectional area.

17 Claims, 3 Drawing Sheets

ELECTRICALLY HEATABLE HONEYCOMB BODY DIVIDED INTO SUBREGIONS WITH ADDITIONAL ELECTRICAL CONDUCTOR ELEMENTS

BACKGROUND OF THE INVENTION

FIELD OF THE INVENTION

The invention relates to an electrically heatable honeycomb body through which a fluid can flow, including a plurality of subregions being electrically separate from one another, particularly for use as a carrier body for heatable catalytic converters in internal combustion engines, wherein an electric current can flow through the honeycomb body over a winding path around insulating points from one subregion to another.

Electrically heatable honeycomb bodies are used as carrier bodies for catalytic converters in order to convert pollutants in combustion exhaust gases of internal combustion engines and they are employed especially in precatalytic converters. In view of the increasingly stringent exhaust gas regulations worldwide for internal combustion engines, it is important for the most complete possible conversion of the exhaust gases to take place even during the cold starting phase. Heatable precatalytic converters, which are heated shortly before and/after the engine is started, are used for that purpose. That assures that the initially still relatively cold exhaust gases will be catalytically converted quickly. Electrically heatable honeycomb bodies are also employed in air heaters and the like.

Such electrically heatable honeycomb bodies are disclosed in International Application WO 89/10471, corresponding to U.S. Pat. No. 5,322,672, and in International Application WO 92/02714, corresponding generally to U.S. application Ser. No. 08/031,953, filed Feb. 1, 1993, for instance. In order to attain a suitable electrical resistance in that case, the honeycomb body is electrically subdivided by gaps or electrically insulating intermediate layers in such a way that at least one electrical current path having the desired resistance is produced.

European Application No. 0 452 125 A2, an electrically heatable honeycomb body is known that is prefereably extruded from a powdered metal slurry and is provided with electrodes on its outer surface. Structures such as slits are made in the honeycomb body and force the electrical current in the honeycomb body to take a winding path. The electric current is turned around or diverted at the ends of the slits. For a given applied voltage, an increased current density and therefore pronounced local heating preferentially occurs at such turning points at the ends of the slits. The honeycomb body can suffer damage at such "hot spots". That not only shortens the service life and causes damage to the honeycomb body, but also means that the honeycomb body is not heated homogeneously either, resulting in an unevenly distributed catalytic action within the honeycomb body. The overall result is that optimal conditions for catalytic operation do not prevail universally inside the honeycomb body for a fluid flow distributed through the entire honeycomb body. The slit honeycomb body is unstable in the presence of vibrational strains between its only two opposed fixed points (which at the same time are current lead-throughs). It must be supported against the housing by means of resilient and electrically insulating "fiber mats". The fibers mats are not stable or elastic over the long term at the temperatures that prevail in the exhaust gas system. The fibers are abraded by the strain. The honeycomb packet, with an elongated length of up to more than 300 mm, is disposed in such a way that it can vibrate freely between the two fixed points. The low natural frequency of that kind of configuration is in the range of the vibrational excitations that occur in the exhaust gas system. The insulating mats must then not only serve to provide durable elastic suspension but also must take on a vibration damping function without wear. Swelling mats of the kind used between a ceramic honeycomb and a metal jacket function fundamentally differently. They swell with the temperature. Swelling mats between metal structures and in the presence of such differential expansions as in that case would have to be dipped or formed by upsetting. Mica, for instance, can therefore not be used.

SUMMARY OF THE INVENTION

It is accordingly an object of the invention to provide an electrically heatable honeycomb body divided into subregions with additional electrical conductor elements, which overcomes the hereinafore-mentioned disadvantages of the heretofore-known devices of this general type, which avoids overheating at current turning points within the honeycomb body and which assures uniform heating of the honeycomb body.

It is also an object of the present invention to furnish a honeycomb body, including various subregions, of high strength and vibrational rigidity with simultaneously largely unhindered expansibility. Fiber mats or movable ceramic insulators toward an outer jacket, as well as vibration damping means, are intended to be avoided.

With the foregoing and other objects in view there is provided, in accordance with the invention, a honeycomb body assembly, comprising an electrically heatable honeycomb body through which a fluid can flow, in particular a carrier body for a catalytic converter, the honeycomb body having a plurality of subregions through which a current can flow over a winding path upon heating, the subregions having a first specific electrical conductivity per unit of cross-sectional area; electrically insulating means at least partially separating the subregions from one another; regions in which electric current is turned around; and additional electric conductor elements in the regions in which the electric current is turned around, the additional electric conductor elements being formed of a material having a greater mechanical strength than that of the subregions and having a second specific electrical conductivity per unit of cross-sectional area being higher than the first specific electrical conductivity per unit of cross-sectional area.

The structure of the honeycomb body according to the invention thus assures that an additional low-impedance current path is furnished for the electric current at the turning point regions, thereby avoiding pronounced heating or over-heating of the honeycomb body at the current turning points.

In accordance with another feature of the invention, the insulating means in the electrically heatable honeycomb body are air gaps, which force a heating current flowing through the honeycomb body to take a winding path.

In accordance with a further feature of the invention, the electrically insulating means are gaps which are filled with an electrically insulating material.

In accordance with an added feature of the invention, the additional conductor elements are mounted on an outer surface of the honeycomb body and thus represent an electrical connection between adjacent subregions of the honeycomb body.

In accordance with an additional feature of the invention, the conductor elements have especially high mechanical strength and serve as a reinforcement of the connection between adjacent subregions of the honeycomb body. This is advantageous particularly if the conductor elements are constructed in such a way that they form retaining elements between the honeycomb body and a housing surrounding the honeycomb body. With this kind of system construction, the mechanical durability can be made largely independent of the honeycomb packet structure itself and largely independent of the electrical resistance. It is possible to use more highly filagreed structures and thus increased surface areas as well as increased electrical resistances without sacrifices in terms of strength.

In accordance with yet another feature of the invention, the retaining structures are at the same time conductor elements in the form of current distributing structures for introducing a current to the honeycomb body and removing it again.

In accordance with yet a further feature of the invention, the conductor elements are connected to the current supply leads and the current output leads. The retaining elements are constructed as bending supports.

In accordance with yet an added feature of the invention, the vibratable maximum length of the honeycomb body is equivalent only to the catalytic converter diameter. This decisively shifts the natural frequency upward into the region outside the critical excitation frequencies.

In accordance with yet an additional feature of the invention, approximately 3 or 4 fixation points are distributed approximately uniformly over the circumference of an outer jacket and are constructed in such a way that an optimum between bendability and vibrational rigidity can be achieved. With this system, depending on the catalytic converter size and structural type, other additional or differently disposed fixation points can also be adapted, depending on the load.

In accordance with again another feature of the invention, the honeycomb body has a circular, oval, rectangular, kidney-shaped or elliptical cross section at right angles to a primary flow direction for a fluid flowing through the honeycomb body.

In accordance with again a further feature of the invention, the gaps extend continuously from a first location on the outer surface to a second location on the outer surface, thereby splitting up the honeycomb body into subregions. The subregions are conductively connected to one another through the additional conductor elements, and the conductor elements are mounted at the turning points of the electric current. As a result, an electrical current can flow over a winding path through the honeycomb body, specifically from one subregion to another, in each case by way of the connecting conductor elements.

In accordance with again an added feature of the invention, the honeycomb body is formed of a honeycomb-like extruded sintered material. The slits can then be formed in the honeycomb body simply by sawing.

Oval, rectangular or otherwise-shaped cross sections may also be put together from strip-like honeycomb web material.

In accordance with a concomitant feature of the invention, the various subregions may include honeycomb structures that are made up of a plurality of layers of metal sheets, at least some of which are reshaped and/or stamped.

In all of the exemplary embodiments of the present invention, the conductor elements connecting adjacent subregions of the honeycomb body on one hand furnish a readily conductive connection at the turning points of the current between adjacent subregions, and on the other hand assure stabilization of the entire honeycomb body.

Other features which are considered as characteristic for the invention are set forth in the appended claims.

Although the invention is illustrated and described herein as embodied in an electrically heatable honeycomb body, divided into subregions, with additional electrical conductor elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
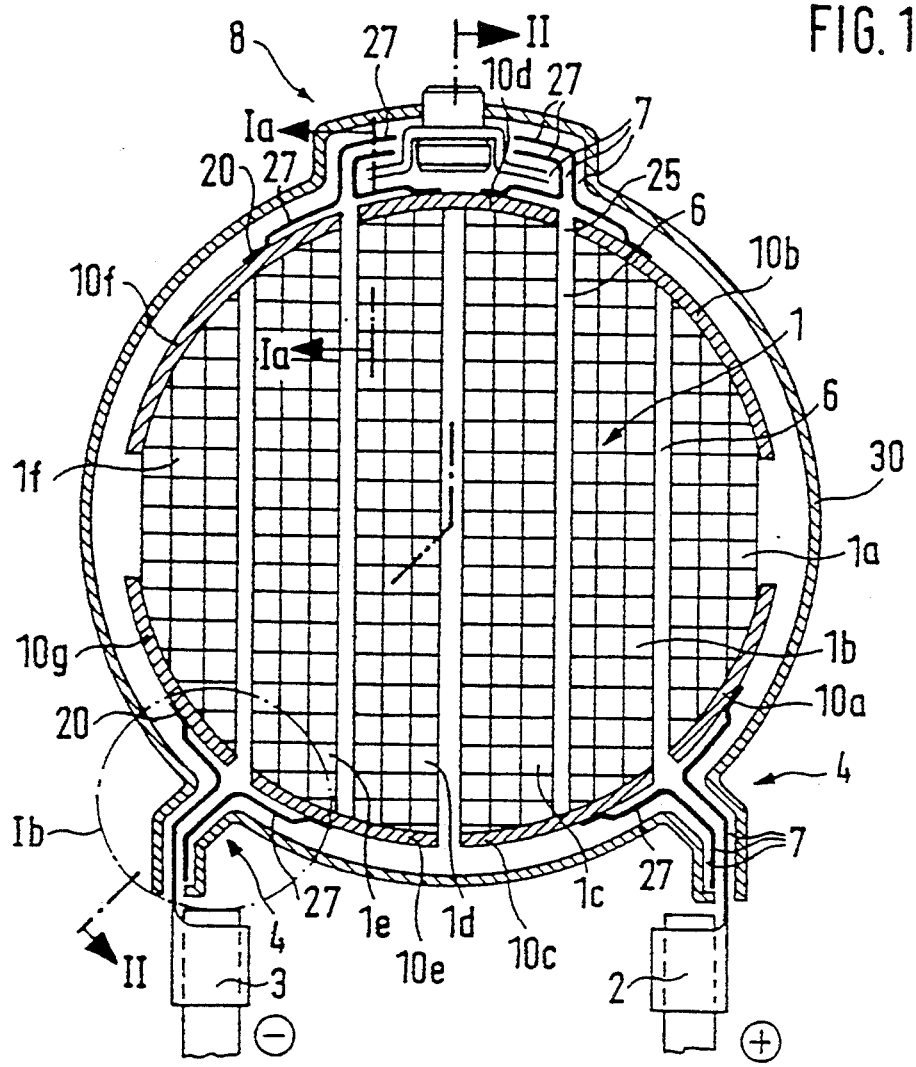
FIG. 1 is a fragmentary, diagrammatic, cross-sectional view of a honeycomb body according to the invention, which is seen at right angles to a primary flow direction.
Figure 2:
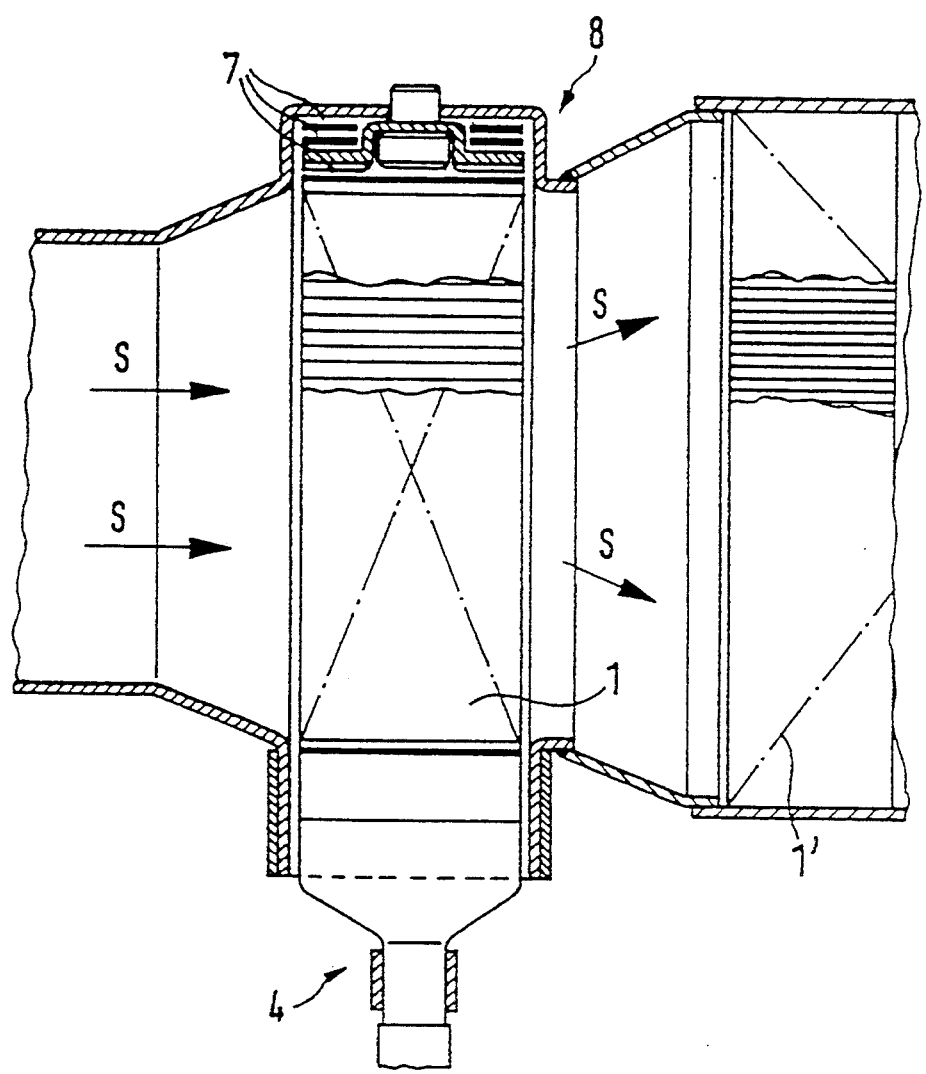
FIG. 2 is a fragmentary, partly broken-away, longitudinal-sectional view of a precatalytic converter located upstream of a main catalytic converter as seen in a primary flow direction, with a honeycomb-like structure indicated in the broken-away regions.

Referring now to the figures of the drawing in detail and first, particularly, to FIG. 1 thereof, there is seen a honeycomb body 1 which is shown in cross section at right angles to a primary flow direction S that is shown in FIG. 2. The honeycomb body includes a first subregion 1a, a second subregion 1b, a third subregion 1c, a fourth subregion 1d, a fifth subregion 1e and a sixth subregion 1f, which are each separated from one another by electrically insulating gaps 6. The various subregions of the honeycomb body are conductively connected to one another by means of conductor elements 10b, 10c, 10d, 10e, 10f. The electrically insulating gaps 6 are either air gaps or gaps filled up with an electrically insulating material. The conductor elements 10a, 10b, 10c, 10d, 10e, 10f, 10g are secured to the various subregions 1a, 1b, 1c, 1d, 1e, 1f of the honeycomb body by brazing or welding or by forceful compaction and simultaneous heating (sintering). In the case of sintered honeycombs, the conductor elements can already be formed on and sintered in the same production process as the honeycomb itself. This assures a good-conducting electrical connection between the subregions and high stability of the entire honeycomb body.

Electric current is introduced into the honeycomb body 1 and removed again by means of an electrical current supply lead 2 and a current output lead 3. The current supply lead 2 and the current output lead 3 each extend through an electric lead-through 4 in a housing 30 that surrounds the honeycomb body 1. In order to provide further stabilization and better suspension of the honeycomb body 1, together with its conductor elements 10a–10g that surround it, reinforcement elements 27 which are additionally present are secured in the electric lead-throughs 4 and on the conductor elements 10a, 10c, 10e, 10g, and are secured on an upper retainer 8 and on the conductor elements 10b, 10d, 10f. In this exemplary embodiment, the retainer 8 with its reinforcement elements 27 serves to secure the honeycomb body 1 to the housing 30. The electric lead-throughs 4 in this exemplary embodiment serve both to secure the honeycomb body 1 to the housing 30 and to supply and remove current. The current supply lead 2 and the current output lead 3 then likewise serve as retainers. The electric lead-throughs 4 are sealed off from the outside with sealing and insulating compound. In the case of the polarity of the electric leads 2, 3 shown in FIG. 1, an electric current flows over a winding path through the honeycomb body. The current flows upward in the subregion 1a, downward in the subregion 1b, upward in the subregion 1c, downward in the subregion 1d, upward in the subregion 1e and finally downward in the subregion 1f. In each case the direction of the current is turned around or diverted between these individual subregions by means of the conductor elements 10b, 10c, 10d, 10e, 10f, and pronounced local overheating does not occur. The conductor elements 10b, 10c, 10d, 10e, 10f offer the advantages that they firstly present low resistance and thus avoid local overheating at the current turning points, and secondly that they have not only good electrical conductivity but also good thermal conductivity, which again leads to more-uniform temperature distribution. The reinforcement elements 27 are joined to the conductor elements 10a–10g at connecting points 20. These reinforcement elements 27 are constructed in such a way that differential expansions can be compensated for without deformation or excessive strains in the honeycomb parts. In particular, the reinforcement elements 27 may be constructed as bending supports or expansion sleeves.

Figure 1A:
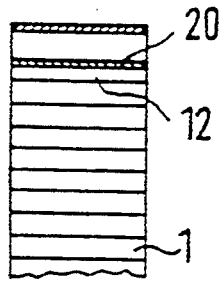
FIG. 1a is a fragmentary, longitudinal-sectional view of a portion of the honeycomb body which is taken along the line Ia—Ia of FIG. 1, in the direction of the arrows.

FIG. 1a shows a portion of a longitudinal section through the honeycomb body which is taken along a plane Ia—Ia. Once again, the connecting point 20 between the conductor element 10d and the reinforcement element 27 is shown.

Figure 1B:
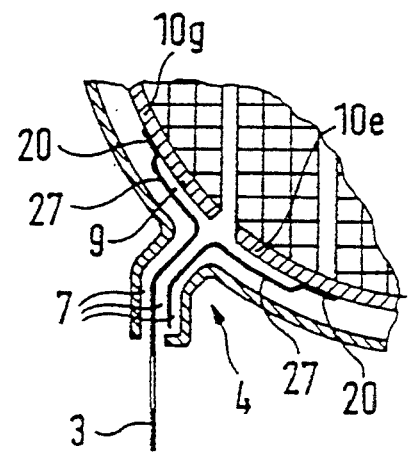
FIG. 1b is an enlarged, fragmentary, cross-sectional view of a portion of the honeycomb body of FIG. 1.

FIG. 1b shows an area with an electric lead-through 4 which is encircled in FIG. 1 and is on a larger scale. In this case the current output lead 3 and the reinforcement elements 27 are secured to the conductor elements 10e, 10g by brazing or welding at the connection point 20. In order to compensate for expansion, an expansion gap 9 for unhindered bending deformation may be furnished between the conductor elements 10e, 10g and the reinforcement element 27.

FIG. 2 shows a precatalytic converter with a honeycomb body 1 in the installed state, upstream of a main catalytic converter with a honeycomb body 1'. The primary flow direction S through the precatalytic converter and the main catalytic converter is indicated by arrows. A sealing and insulating compound 7 is shown for the retainer 8, which is partly broken away in FIG. 2. The electric lead-through 4 is also shown. The boundary surfaces at the flow inlet and outlet which are shown as planes in FIG. 2, can also be constructed conically or in a spherically curved form.

Figure 3:
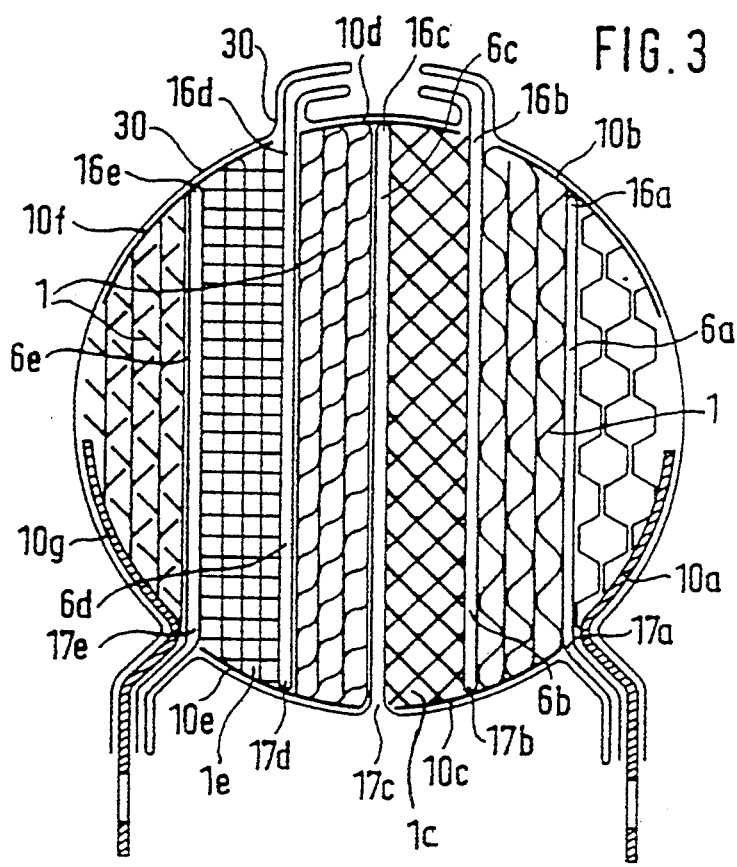
FIG. 3 is a cross-sectional view showing different honeycomb structures in each individual subregion, which is seen at right angles to the primary flow direction through a honeycomb body.

FIG. 3 is a somewhat more diagrammatic view which shows a cross section at right angles to the primary flow direction through the honeycomb body 1. The various subregions 1a, 1b, 1c, 1d, 1e, 1f of the honeycomb body are represented by various examples of honeycomb structures that may be shaped from metal sheets or by extrusion. Each of several gaps 6a, 6b, 6c, 6d, 6e extends from a first point 16a, 16b, 16c, 16d, 16e on the surface of the honeycomb body 1 to a second point 17a, 17b, 17c, 17d, 17e on the surface of the honeycomb body 1.

Figure 4:
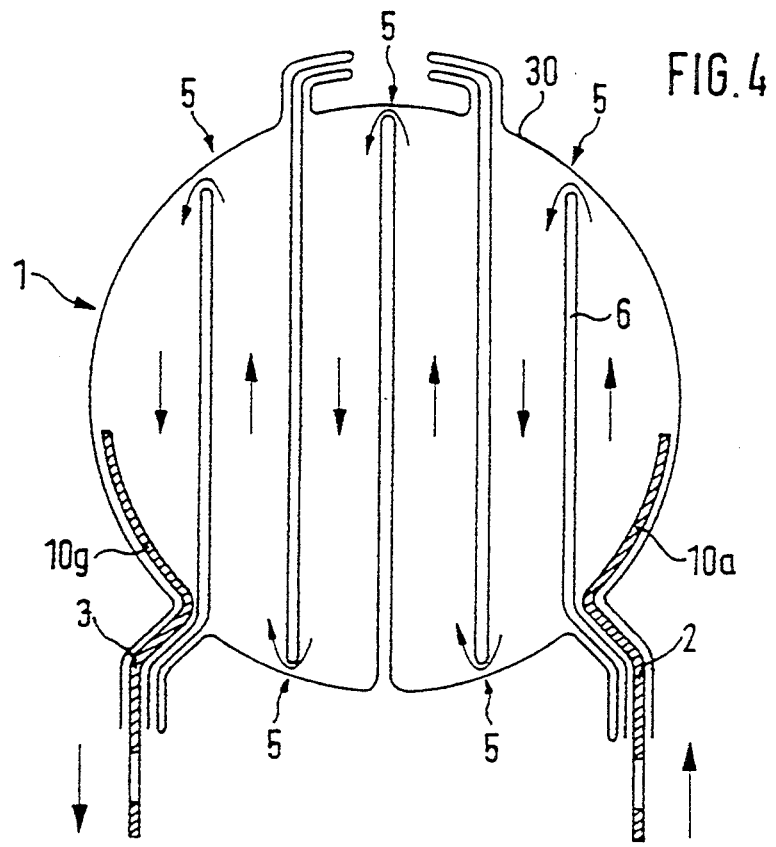
FIG. 4 is a cross-sectional view showing a typical winding current path through a honeycomb body according to the invention.

FIG. 4 uses the same cross section as in FIGS. 1 and 3 to show the course of current through the honeycomb body 1. The current is fed into the first subregion through the current supply lead 2 and the conductor element 10a; it then flows vertically upward, where it is turned around at a current turning point or diversion region 5 by the conductor element 10b. The current thereupon flows downward through the next subregion, to the next current turning point region 5, where it is deflected upward again by the conductor element 10c. This continues through the further subregions and at the further conductor elements until the current in the last subregion arrives, flowing downward, and is then guided by the conductor element 10g to the current output lead 3. The conductor elements 10b, 10c, 10d, 10e and 10f at the current turning points 5 prevent excessive heating and possible damage or breakage of the honeycomb body at the turning points 5.

FIG. 4 also shows the housing 30 which preferably includes one or more sheet-metal strips that are bent or folded into the desired shape shown in FIG. 4. Stamped or pre-shaped honeycomb structures can then be placed in this housing 30. At the end, all of the metal sheets and honeycomb structures are then brazed jointly together. The honeycomb bodies of the subregions 1a, 1b, 1c, 1d, 1e and 1f may be shaped in such a way that the end surfaces of the entire honeycomb body 1 have a conical or curved shape.

By combining metal and ceramic honeycomb bodies in the various subregions 1a–1f of the honeycomb body 1, it is possible to generate axially different resistances for a fluid flowing through the honeycomb body in the primary flow direction. The wall thicknesses of the various honeycomb bodies may then be different in the various subregions, as an example, and perforations may be made in the walls of the individual honeycomb bodies.

In honeycomb bodies made of sintering material, the slits 6 may be made by sawing. Preferably, the sintered honeycomb bodies are sawed all the way through into multiple parts, so that in the honeycomb body 1 including a plurality of the subregions 1a–1f, the current turning points 5 will coincide with bridging points of the conductor elements 10b–10f, so that potential overheating points are avoided or are at least located on the surface of the honeycomb body and in the conductor elements 10.

It has thus been demonstrated that the present invention is especially well suited to avoiding overheating and resultant damage at current turning points of the honeycomb body as well as to increase the strength of the honeycomb body including the subregions.

I claim:

1. A honeycomb body assembly, comprising:
   an electrically heatable honeycomb body through which a fluid can flow, said honeycomb body having:
   a plurality of subregions through which a current can flow over a winding path, said subregions being formed of a first material having a first specific electrical conductivity per unit of cross-sectional area;
   electrically insulating means at least partially separating said subregions from one another;
   regions in which electric current is turned around and in which the electric current flows from one subregion to another subregion; and
   additional electric conductor elements in said regions in which the electric current is turned around, said additional electric conductor elements being formed of a second material having a greater mechanical strength than the first material of said subregions and having a second specific electrical conductivity per unit of cross-sectional area being higher than said first specific electrical conductivity per unit of cross-sectional area.

2. The honeycomb body assembly according to claim 1, wherein said electrically insulating means are gaps between said subregions.

3. The honeycomb body assembly according to claim 2, including electrically insulating material filling said gaps.

4. The honeycomb body assembly according to claim 1, wherein said honeycomb body has an outer surface on which said conductor elements are mounted for electrically connecting said subregions.

5. The honeycomb body assembly according to claim 1, wherein said subregions are adjacent one another, and said conductor elements form a mechanically reinforced connection between said adjacent subregions.

6. The honeycomb body assembly according to claim 1, including a housing, and electric lead-throughs between said honeycomb body and said housing, said conductor elements at least partly forming retaining elements in said electric lead-throughs.

7. The honeycomb body assembly according to claim 1, wherein said conductor elements are at least partly current distributing structures for introducing a current into and directing the current out of said honeycomb body.

8. The honeycomb body assembly according to claim 1, including current supply leads and current output leads to which some of said conductor elements are connected.

9. The honeycomb body assembly according to claim 1, wherein said honeycomb body has a cross section perpendicular to a primary flow direction for a fluid, said cross section having a shape selected from the group consisting of circular, oval, kidney-shaped and elliptical.

10. The honeycomb body assembly according to claim 1, wherein said honeycomb body has a maximum vibratable length and a diameter being substantially equivalent to each other.

11. The honeycomb body assembly according to claim 1, including a housing, and a retainer securing said honeycomb body to said housing at least at three points.

12. The honeycomb body assembly according to claim 11, wherein said retainer secures said honeycomb body to said housing at four points.

13. The honeycomb body assembly according to claim 1, wherein said honeycomb body has an outer surface with first points and second points, and said gaps are continuous and each extend from a respective one of said first points to a respective one of aid second points, giving said subregions a shape of elongated disks in a primary flow direction of the fluid.

14. The honeycomb body assembly according to claim 13, including a housing for said honeycomb body being bent in a meandering form from at least one sheet-metal strip.

15. The honeycomb body assembly according to claim 1, wherein said honeycomb body is formed of a honeycomb-like sintered material.

16. The honeycomb body assembly according to claim 1, wherein said honeycomb body is formed of extruded material.

17. The honeycomb body assembly according to claim 1, wherein said honeycomb body is formed of a mixture of sintered metal powder and ceramic powder.

* * * * *